(12) United States Patent
Hiratsuka et al.

(10) Patent No.: US 10,816,003 B2
(45) Date of Patent: Oct. 27, 2020

(54) ELECTRIC PUMP

(71) Applicant: AISIN SEIKI KABUSHIKI KAISHA, Kariya-shi, Aichi-ken (JP)

(72) Inventors: Yuta Hiratsuka, Anjo (JP); Koichi Aizawa, Chiryu (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 185 days.

(21) Appl. No.: 16/162,766

(22) Filed: Oct. 17, 2018

(65) Prior Publication Data

US 2019/0120235 A1   Apr. 25, 2019

(30) Foreign Application Priority Data

Oct. 20, 2017   (JP) .................................. 2017-203646

(51) Int. Cl.
| | |
|---|---|
| *F04D 15/00* | (2006.01) |
| *H02P 27/08* | (2006.01) |
| *H02P 6/08* | (2016.01) |
| *H02P 7/29* | (2016.01) |
| *F04D 15/02* | (2006.01) |

(52) U.S. Cl.
CPC ..... *F04D 15/0066* (2013.01); *F04D 15/0077* (2013.01); *F04D 15/0088* (2013.01); *F04D 15/0094* (2013.01); *F04D 15/0281* (2013.01); *H02P 6/08* (2013.01); *H02P 7/29* (2013.01); *H02P 27/085* (2013.01)

(58) Field of Classification Search
None
See application file for complete search history.

(56) References Cited

U.S. PATENT DOCUMENTS

| | | | |
|---|---|---|---|
| 2008/0230035 A1* | 9/2008 | Inoue | F02D 33/003 123/497 |
| 2009/0224714 A1* | 9/2009 | Serizawa | H02P 7/29 318/434 |

FOREIGN PATENT DOCUMENTS

| | | |
|---|---|---|
| JP | 2012225288 A | 11/2012 |
| JP | 201744167 A | 3/2017 |

* cited by examiner

*Primary Examiner* — Bentsu Ro
(74) *Attorney, Agent, or Firm* — Buchanan Ingersoll & Rooney PC

(57) ABSTRACT

An electric pump includes: a motor that drives a pump; and a control unit to which an input signal for driving the motor is input from an external device, which outputs a drive signal based on the input signal, and which outputs a pulse signal indicating a rotation state of the motor to the external device, in which the control unit is configured to change both of a frequency and a duty ratio of the pulse signal so as to be capable of discriminating whether the motor is in a drive state or a stop state and between a plurality of states of the motor in the stop state.

11 Claims, 3 Drawing Sheets

US 10,816,003 B2

ELECTRIC PUMP

CROSS REFERENCE TO RELATED APPLICATIONS

This application is based on and claims priority under 35 U.S.C. § 119 to Japanese Patent Application 2017-203646, filed on Oct. 20, 2017, the entire contents of which are incorporated herein by reference.

TECHNICAL FIELD

This disclosure relates to an electric pump, particularly, an electric pump including a control unit that outputs a pulse signal indicating a rotation state of a motor.

BACKGROUND DISCUSSION

In the related art, there is known an electric pump including a control unit that outputs a pulse signal indicating a rotation state of a motor (for example, see JP 2017-44167A (Reference 1).

An electric water pump disclosed in Reference 1 is connected to an electronic control unit via a first signal line and a second signal line. The electronic control unit transmits a drive control signal to the electric water pump via the first signal line. In addition, the electronic control unit receives a rotation speed signal of the electric water pump via the second signal line. In addition, a thermistor is provided in the vicinity of a discharge port of the electric water pump. In a case where the thermistor turns ON (case where a detected temperature by the thermistor is equal to or below a freezing temperature of a cooling medium of the electric water pump), and in a case where the electric water pump has a rotation speed of 0, a signal (rotation speed signal) indicating that a high potential equal to or higher than a predetermined threshold voltage is maintained is transmitted to the electronic control unit via the second signal line.

In addition, the electronic control unit executes a malfunction diagnosis of the electric water pump during drive of the electric water pump. Specifically, whether or not the rotation speed signal that is transmitted via the second signal line is the pulse signal is determined. In a case where the rotation speed signal is determined to be the pulse signal, and in a case where a frequency of the pulse signal is equal to or higher than a predetermined pulse frequency threshold, the electric water pump is determined to be normally driven. In addition, in a case where the frequency of the pulse signal is smaller lower than the predetermined pulse frequency threshold, the electric water pump is determined to be stopped due to lock malfunction (stop due to a mechanical malfunction of the pump).

In addition, in a case where the rotation speed signal that is transmitted via the second signal line is determined not to be the pulse signal, and in a case where the rotation speed signal is maintained to have a voltage equal to or higher than a predetermined threshold voltage, the electric water pump is determined to be in a state of being incapable of being driven due to freezing. In other words, it is possible to discriminate between whether the electric water pump is stopped due to freezing or is stopped due to the lock malfunction, based on higher and lower frequencies (two values) of the pulse signal than the predetermined pulse frequency threshold or higher and lower potentials (two values) of the pulse signal than a threshold voltage value.

However, since the electric water pump in Reference 1 is configured to be capable of discriminating between states of the motor based on the higher and lower frequencies (two values) of the pulse signal than the predetermined pulse frequency threshold or the higher and lower potentials (two values) of the pulse signal than the threshold voltage value, there is limitation to the number of discriminable states of the electric water pump (the motor that drives the electric water pump). In other words, it is possible to discriminate between only four states of two states based on frequencies and two states based on potentials to the maximum. In this case, a problem arises in that it is difficult for the electronic control unit to discriminate the state of the electric water pump with accuracy in some cases.

Thus, a need exists for an electric pump which is not susceptible to the drawback mentioned above.

SUMMARY

An electric pump according to an aspect of this disclosure includes: a motor that drives a pump; and a control unit to which an input signal for driving the motor is input from an external device, which outputs a drive signal based on the input signal, and which outputs a pulse signal indicating a rotation state of the motor to the external device. The control unit is configured to change both of a frequency and a duty ratio of the pulse signal so as to be capable of discriminating whether the motor is in a drive state or a stop state and between a plurality of states of the motor in the stop state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment disclosed here will be described with reference to the drawings.

Embodiment

A configuration of an electric pump 100 according to the embodiment is described with reference to FIGS. 1 to 5.

Figure 1:
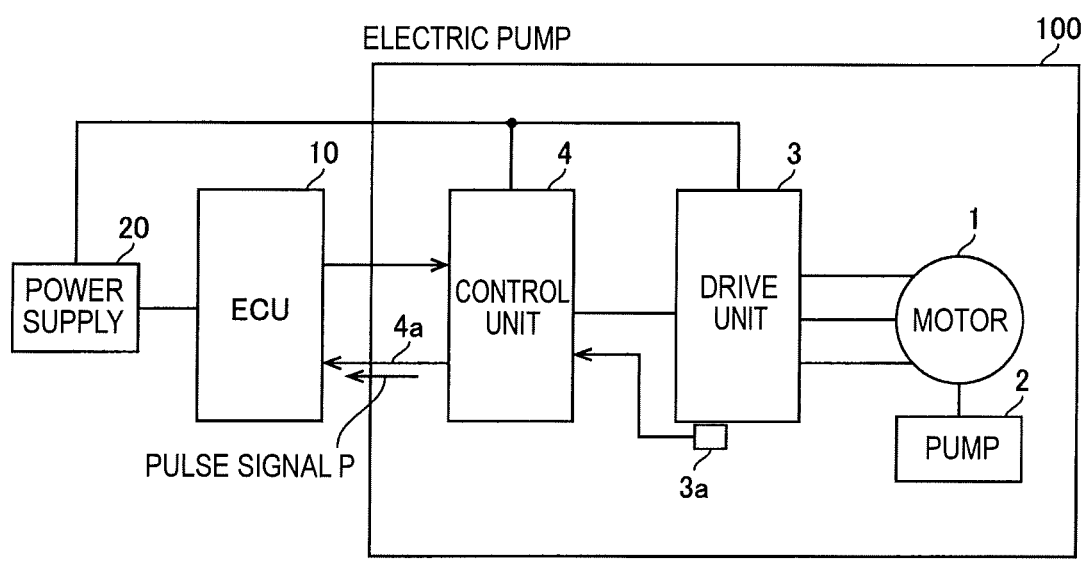
FIG. 1 is a diagram illustrating an entire configuration of an electric pump according to an embodiment.

As illustrated in FIG. 1, the electric pump 100 includes a motor 1. The motor 1 drives a pump 2 that is connected to the motor 1. The electric pump 100 (pump 2) is considered to be used as a water pump, an oil pump, a vacuum pump, and the like, for example.

The electric pump 100 includes a drive unit 3 that drives the motor 1. The drive unit 3 includes a plurality of semiconductor switching elements (not illustrated). The motor 1 is driven by a three-phase AC voltage from the drive unit 3.

In addition, the electric pump 100 includes a control unit 4. An input signal for driving the motor 1 is input to the control unit 4 from an engine control unit (ECU) 10. The control unit 4 outputs a drive signal for driving the motor 1 to the drive unit 3, based on the input signal input from the ECU 10. In addition, the control unit 4 receives information indicating a rotation state of the motor 1 by a sensor not illustrated. The control unit 4 outputs a pulse signal P (refer to FIG. 2) indicating a rotation state of the motor 1 to the ECU 10 based on the received information of the rotation state. The control unit 4 may be configured of software or may be configured of hardware. In addition, the ECU 10 is an example of an "external device" in the appended claims.

In addition, a voltage from a power supply 20 is supplied to each of the electric pump 100 and the ECU 10. Specifically, the voltage from the power supply 20 is supplied to each of the drive unit 3 and the control unit 4 of the electric pump 100.

Figure 2:
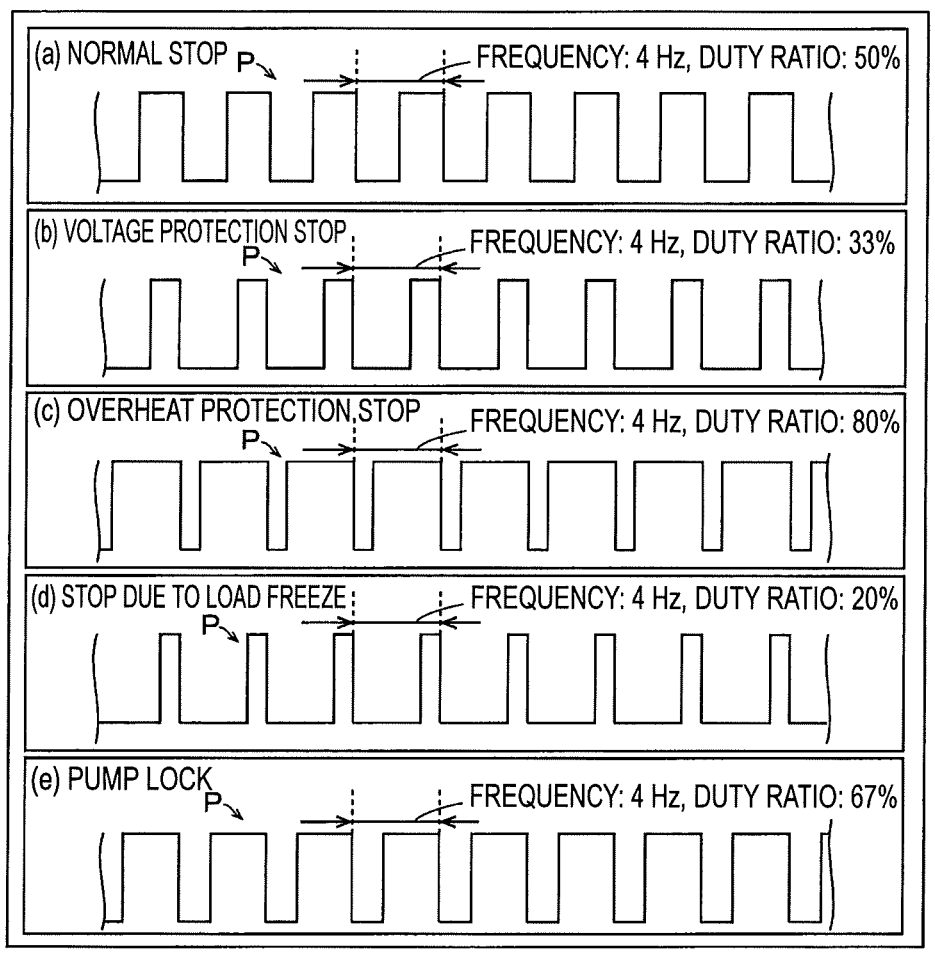
FIG. 2 is a graph for illustrating a pulse signal during a stop of the electric pump according to the embodiment ((a) in FIG. 2 is a graph of the pulse signal during a normal stop, (b) in FIG. 2 is a graph of the pulse signal during a voltage protection stop, (c) in FIG. 2 is a graph of the pulse signal during an overheat protection stop, (d) in FIG. 2 is a graph of the pulse signal during a stop due to load freeze, and (e) in FIG. 2 is a graph of the pulse signal during pump lock)

Here, as illustrated in FIG. 2, in the embodiment, the control unit 4 (refer to FIG. 1) is configured to change both of a frequency and a duty ratio of the pulse signal P so as to be capable of discriminating whether the motor 1 (refer to FIG. 1) is in a drive state or a stop state and between a plurality of states of the motor 1 in the stop state. Specifically, the control unit 4 is configured to output, as one pulse signal P, a combination of information of the frequency and information of the duty ratio of the pulse signal P to the ECU 10 (refer to FIG. 1). In other words, the control unit 4 transmits the pulse signal P to the ECU 10 by using only one communication line 4a (refer to FIG. 1). In addition, the control unit 4 is configured to be capable of changing a frequency and a duty ratio in one pulse signal P individually. The communication line 4a is an example of a "signal line" in the appended claims.

To be more specific, the control unit 4 sets the frequency of the pulse signal P to 4 Hz in a case where the motor 1 is in the stop state. In addition, as illustrated in (a) to (e) in FIG. 2 to be described below, the control unit 4 changes the duty ratio of the pulse signal P corresponding to the plurality of states of the motor 1 in the stop state. Hereinafter, an example of control of a frequency and a duty ratio of the pulse signal P in a case where the motor 1 is in the stop state will be described. 4 Hz is an example of a "predetermined frequency" in the appended claims.

As illustrated in (a) in FIG. 2, in a case where the motor 1 is normally stopped, the control unit 4 sets the frequency of the pulse signal P to 4 Hz and sets the duty ratio of the pulse signal P to 50%. In this case, an input signal that is transmitted from the ECU 10 to the control unit 4 is a stop signal for stopping the motor 1. In addition, 50% is an example of a "normal stop duty ratio" in the appended claims.

In addition, as illustrated in (b) in FIG. 2, in a case where the motor 1 is in a voltage protection stop state, the control unit 4 sets the frequency of the pulse signal P to 4 Hz and sets the duty ratio of the pulse signal P to 33%. The voltage protection stop state means a state in which the motor 1 is stopped in a case where a voltage value that is supplied to the control unit 4 is very low or very high.

Specifically, the control unit 4 detects a voltage value that is supplied from the power supply 20 (refer to FIG. 1) to the control unit 4. In a case where the motor 1 is stopped in a state in which the voltage value detected by the control unit 4 is out of a predetermined range (for example, 5 V or higher and 20 V or lower), the control unit 4 sets the frequency of the pulse signal P to 4 Hz and sets the duty ratio of the pulse signal P to 33%. In (b) in FIG. 2 and each of (c) to (e) in FIG. 2 to be described below, an input signal that is transmitted from the ECU 10 to the control unit 4 is a drive signal for driving the motor 1. In other words, in such a case, although the drive signal is input from the ECU 10, the motor 1 is stopped in some cases. A case of the voltage protection stop state is an example of a "first case" in the appended claims.

In addition, as illustrated in (c) in FIG. 2, in a case where the motor 1 is in an overheat voltage protection stop state, the control unit 4 sets the frequency of the pulse signal P to 4 Hz and sets the duty ratio of the pulse signal P to 80%. The overheat protection stop state means a state in which the motor 1 is stopped because a temperature of the drive unit 3 is very high. A case where the motor 1 is in the overheat protection stop state is an example of a "second case" in the appended claims.

Specifically, a thermistor 3a for detecting the temperature of the drive unit 3 is provided in the vicinity of the drive unit 3. Temperature information of the motor 1 detected by the thermistor 3a is transmitted to the control unit 4. To be more specific, the temperature information of the drive unit 3 is transmitted to the control unit 4 based on a resistance value (a change) of the thermistor 3a. In a case where the motor 1 is stopped in a state in which a temperature of the drive unit 3 (which is detected, based on the temperature information transmitted from the thermistor 3a) is a first threshold temperature or higher, the control unit 4 sets the frequency of the pulse signal P to 4 Hz and sets the duty ratio of the pulse signal P to 80%.

In addition, as illustrated in (d) in FIG. 2, in a case where the motor 1 is stopped due to load freeze, the control unit 4 sets the frequency of the pulse signal P to 4 Hz and sets the duty ratio of the pulse signal P to 20%. A stop state due to the load freeze means a state in which the pump 2 freezes because the temperature is very low, and thus the motor 1 (pump 2) is stopped. A case where the motor 1 is in the stop state due to load freeze is an example of a "third case" in the appended claims.

Specifically, in a case where the motor 1 is stopped in a state in which a temperature of the drive unit 3 (which is detected, based on the temperature information transmitted from the thermistor 3a) is a second threshold temperature (for example, 0 degrees) or lower, the control unit 4 sets the frequency of the pulse signal P to 4 Hz and sets the duty ratio of the pulse signal P to 20%.

In addition, as illustrated in (e) in FIG. 2, in a case where the motor 1 is stopped due to pump lock, the control unit 4 sets the frequency of the pulse signal P to 4 Hz and sets the duty ratio of the pulse signal P to 67%. A stop state due to the pump lock means a state in which the motor 1 (pump 2) is stopped due to mechanical malfunction of the pump 2. A case where the motor 1 is in the stop state due to the pump lock is an example of a "fourth case" in the appended claims.

Specifically, in a case where the motor 1 is stopped in a state in which a voltage value that is supplied from the control unit 4 is within the predetermined range, and a temperature of the drive unit 3 is lower than the first threshold temperature and higher than the second threshold temperature, the control unit 4 sets the frequency of the pulse signal P to 4 Hz and sets the duty ratio of the pulse signal P to 67%.

The duty ratios in the states of (a) to (e) in FIG. 2 are not limited to the above-described values. As long as the duty ratio in the state in which the motor 1 is normally stopped (refer to (a) in FIG. 2) is different from the duty ratio in the state in which the motor 1 is abnormally stopped (refer to (b) to (e) in FIG. 2), and the duty ratios in the states of the cases of abnormal stop of the motor 1 are different from each other, the duty ratio may be any value other than the above-described values.

Figure 3:
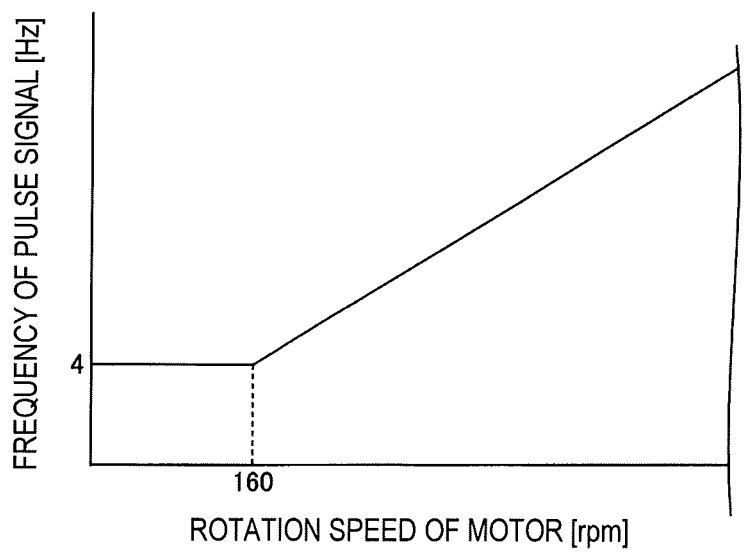
FIG. 3 is a graph for illustrating a relationship between the rotation speed of the motor and a frequency of the pulse signal of the electric pump according to the embodiment.

Here, in the embodiment, as illustrated in FIG. 3, the control unit 4 (refer to FIG. 1) is configured to set the pulse signal P (refer to FIG. 4) to a frequency other than 4 Hz in a case where the motor 1 (refer to FIG. 1) is in the drive state. Specifically, the control unit 4 is configured to be capable of changing the pulse signal P in a range of frequency that is different from 4 Hz, depending on the rotation speed of the motor 1, in a case where the motor 1 is in the drive state. To be more specific, in a case where the rotation speed of the motor 1 is 160 rpm or smaller, the frequency of the pulse signal P is set to 4 Hz. In addition, in a case where the rotation speed of the motor 1 is larger than 160 rpm, the frequency of the pulse signal P increases linearly as a linear function as the rotation speed of the motor 1 increases. In the embodiment, the motor 1 is in the stop state in a case where the rotation speed of the motor 1 is 160 rpm or smaller, and the motor 1 is in the drive state in a case where the rotation speed of the motor 1 is larger than 160 rpm. Hereinafter, an example of control of the frequency and the duty ratio of the pulse signal P in a case where the motor 1 is in the drive state will be described.

Figure 4:
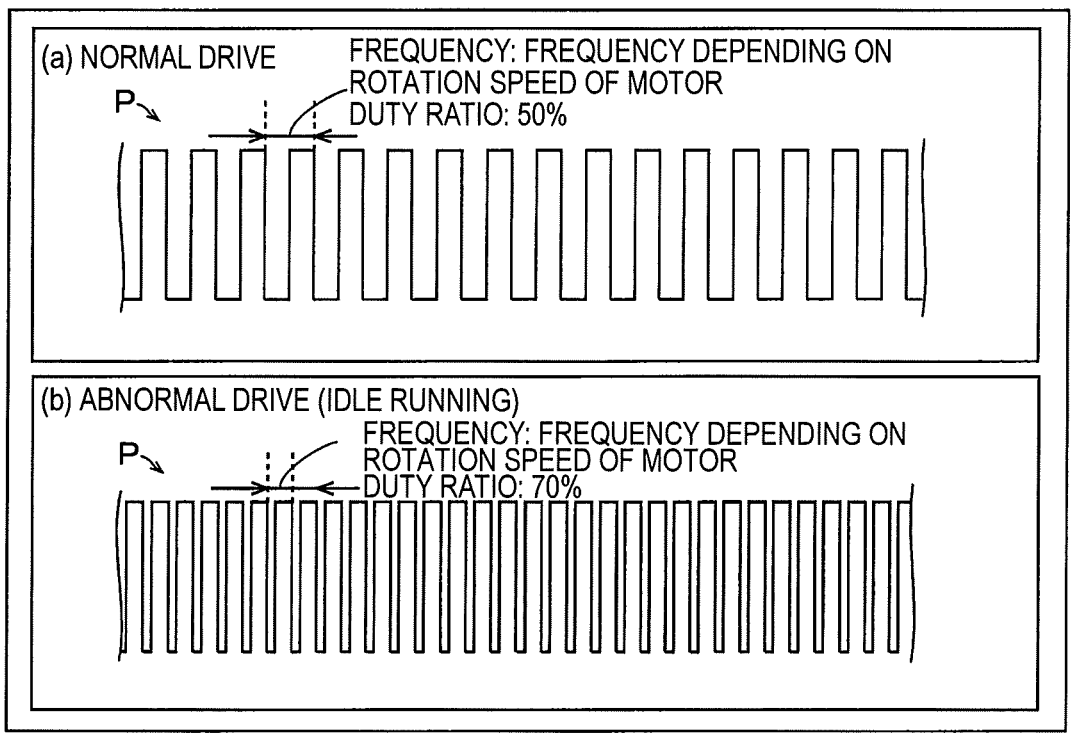
FIG. 4 is a graph for illustrating a pulse signal during the stop of the electric pump according to the embodiment ((a) in FIG. 4 is a graph of a pulse signal during normal drive, and (b) in FIG. 4 is a graph of a pulse signal during abnormal drive (idle running)

In the embodiment, as illustrated in (a) in FIG. 4, in a case where the motor 1 (refer to FIG. 1) is normally driven, the control unit 4 (refer to FIG. 1) sets the duty ratio of the pulse signal P to 50%. In this case, the frequency of the pulse signal P is set to a frequency (refer to FIG. 3) depending on the rotation speed of the motor 1.

In addition, as illustrated in (b) in FIG. 4, in a case where the motor 1 is in an abnormal drive state due to idle running of the pump 2 (refer to FIG. 1), the control unit 4 is configured to set the duty ratio of the pulse signal P to 70%. Specifically, in a case where the motor 1 is driven (is rotated) in a state in which the rotation speed of the motor 1 is the predetermined rotation speed or larger, the control unit 4 determines that the pump 2 is in an idle running state and sets the duty ratio of the pulse signal P to 70%. The idle running state of the pump 2 means a state in which the pump 2 is driven in a state in which there is no refrigerant inside the pump 2 (for example, no water in a water pump). In this case, the rotation speed of the motor 1 increases too much with respect to a set value.

The duty ratios in the states of (a) and (b) in FIG. 4 are not limited to the above-described values. As long as the duty ratio in the state in which the motor 1 is normally driven (refer to (a) in FIG. 4) is different from the duty ratio in the state in which the motor 1 is abnormally driven (refer to (b) in FIG. 4), the duty ratio may be any value other than the above-described values. In addition, (a) and (b) in FIG. 4 are schematic graphs, and actual ratios of frequencies thereof are different from those in the states illustrated in the drawing in some cases.

Figure 5:
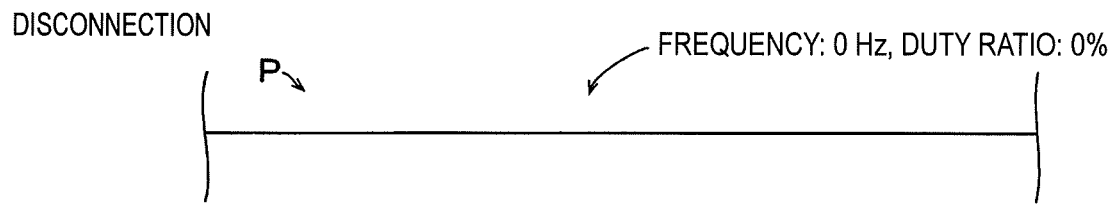
FIG. 5 is a graph for illustrating a pulse signal during disconnection of the electric pump according to the embodiment.

In addition, in the embodiment, as illustrated in FIG. 5, the control unit 4 (refer to FIG. 1) is configured to set the pulse signal P to a frequency other than 4 Hz in a case where the motor 1 (refer to FIG. 1) is not in an energized state due to disconnection. Specifically, the control unit 4 is configured to set the frequency of the pulse signal P to 0 Hz and the duty ratio of the pulse signal P to 0 in a case where the motor 1 is not in the energized state due to disconnection. The control unit 4 determines that the disconnection occurs in a case where no voltage is supplied from the power supply 20 to the control unit 4, in a case where information indicating a rotation state of the motor 1 is not transmitted to the control unit 4, or the like.

Effects of Embodiment

In the embodiment, it is possible to achieve the following effects.

In the embodiment, as described above, the electric pump 100 has the configuration such that the control unit 4 changes both of the frequency and the duty ratio of the pulse signal P so as to be capable of discriminating whether the motor 1 is in the drive state or the stop state and between the plurality of states of the motor 1 in the stop state. Here, in a case of a configuration in which it is possible to discriminate between the states of the motor based on higher and lower potentials (frequencies) (two values) of the pulse signal than the threshold value of the voltage (the threshold value of the frequency), there is limitation to the number of discriminable states of the motor. By comparison, both of the frequency and the duty ratio of the pulse signal P are changed such that the configuration is achieved in which it is possible to discriminate whether the motor 1 is in the drive state or the stop state and between the plurality of states of the motor 1 in the stop state. In this manner, it is possible to set each of the duty ratio and the frequency for each state, and thus it is possible to easily increase the number of discriminable states to at least five or more states. As a result, it is possible to discriminate between the states of the motor 1 with accuracy.

In addition, in the embodiment, as described above, the electric pump 100 has the configuration such that the control unit 4 sets the pulse signal P to 4 Hz in a case where the motor 1 is in the stop state and to set the pulse signal P to a frequency other than 4 Hz in a case where the motor 1 is in the drive state. Consequently, the control unit 4 is easily discriminable whether the motor 1 is in the stop state or in the drive state based on the frequency of the pulse signal P.

In addition, in the embodiment, as described above, the electric pump 100 has the configuration such that the control unit 4 is capable of changing the pulse signal P in a range of frequency that is different from 4 Hz, depending on the rotation speed of the motor 1, in a case where the motor 1 is in the drive state. Consequently, the control unit 4 is also discriminable of the rotation speed of the motor 1 during drive based on the frequency of the pulse signal P, in addition to discriminating whether the motor 1 is in the stop state or in the drive state.

In addition, in the embodiment, as described above, the electric pump 100 has the configuration such that the control unit 4 changes both of the frequency and the duty ratio of the pulse signal P and outputs the combination of the information of the frequency and the information of the duty ratio of the pulse signal P to the ECU 10 via one communication line 4a. Consequently, it is possible to output the information of the frequency of the pulse signal P and the information of the duty ratio of the pulse signal P to the ECU 10 via one communication line 4a simultaneously. As a result, it is possible to more reduce the number of components (number of communication lines), compared to a case where the information of the frequency of the pulse signal P and the information of the duty ratio of the pulse signal P are output via separate communication lines from each other.

In addition, in the embodiment, as described above, the electric pump 100 has the configuration such that the control unit 4 sets the pulse signal P to a frequency other than 4 Hz in a case where the motor 1 is not in the energized state due to disconnection. Consequently, the control unit 4 is also capable of discriminating whether the motor 1 is in the stop state or in the disconnection state based on the frequency of the motor 1, in addition to discriminating whether the motor 1 is in the drive state or in the stop state and between the plurality of states in the stop state.

In addition, in the embodiment, as described above, the electric pump 100 has the configuration such that the control unit 4 sets the duty ratio of the pulse signal P to 50% in a case where the motor 1 is normally stopped and sets the duty ratios of the case where the motor 1 is in the voltage protection stop state, the case where the motor 1 is in the overheat protection stop state, the case where the motor 1 is in the stop state due to the load freeze, and the case where the motor 1 is in the stop state due to the pump lock, to the duty ratios that are different from 50% and are different from each other. Consequently, the control unit 4 is capable of discriminating whether the motor 1 is normally stopped or abnormally stopped (the voltage protection stop, the overheat protection stop, the stop due to the load freeze, and the stop due to the pump lock), based on the duty ratio of the pulse signal P. In addition, in a case where the motor 1 is abnormally stopped, the duty ratios of the respective cases are different from each other, and thereby the control unit 4 is capable of discriminating between causes of the abnormal stops.

In addition, in the embodiment, as described above, the electric pump 100 has the configuration such that the control unit 4 sets the duty ratio of the pulse signal P to 50% in the case where the motor 1 is normally driven and sets the duty ratio of the pulse signal P to 70% in the case where the motor 1 is driven in a state in which the rotation speed of the motor 1 is equal to or higher than the predetermined rotation speed. Consequently, the control unit 4 is capable of discriminating whether the motor 1 is normally driven or abnormally driven (the motor 1 is rotated at the predetermined rotation speed or higher), based on the duty ratio of the pulse signal P.

In addition, in the embodiment, as described above, the electric pump 100 has the configuration such that the control unit 4 sets the frequency of the pulse signal P to 0 Hz and the duty ratio of the pulse signal P to 0 in a case where the motor 1 is not in the energized state due to the disconnection. Consequently, in a case of the configuration in which the frequency and the duty ratio of the pulse signal P are set to a value other than 0 in a case where disconnection does not occur, the control unit 4 is capable of easily discriminating whether or not the disconnection occurs.

MODIFICATION EXAMPLES

The embodiment disclosed here is described as an example in all respects and is considered not to be restrictive. A range disclosed here is not represented by the description of the above-mentioned embodiment but represented by the appended claims and, further, includes every modification (modification example) within a meaning and a range which are equivalent to the appended claims.

In addition, in the embodiment, the example is described, in which the frequency of the pulse signal in the case where the motor is stopped is different from the frequency of the pulse signal in the case where the motor is driven; however, the configuration disclosed here is not limited to the example. For example, the duty ratios of the pulse signal in the cases may be set to be different from each other, in addition to causing the frequency of the pulse signal in the cases to be different from each other.

In addition, in the embodiment, the example is described, in which the control unit sets the frequency of the pulse signal to 0 Hz and the duty ratio of the pulse signal to 0 during the disconnection; however, the configuration disclosed here is not limited to the example. For example, the control unit may set the frequency of the pulse signal to a frequency other than 0 Hz and to a frequency other than the predetermined frequency (4 Hz) during the disconnection. In addition, in this case, the duty ratio of the pulse signal may be different from the duty ratios during the stop and the drive of the motor or may be equal to one of the duty ratios during the stop and the drive.

In addition, in the embodiment, the example is described, in which the control unit receives the information indicating the rotation state of the motor by a sensor; however, the configuration disclosed here is not limited to the example. For example, the control unit may be configured to detect information indicating a rotation state of the motor without using the sensor.

In addition, in the embodiment, the example is described, in which the thermistor (3a) is disposed in the vicinity of the drive unit and detects the temperature of the drive unit; however, the configuration disclosed here is not limited to the example. For example, the thermistor (3a) may be configured to be disposed in the vicinity of the pump (motor) and to detect the temperature of the pump (motor).

In addition, in the embodiment, the example is described, in which the frequency of the pulse signal is 4 Hz in a case where the motor is stopped; however, the configuration disclosed here is not limited to the example. For example, the frequency of the pulse signal may be set to a frequency other than 4 Hz.

In addition, in the embodiment, the example is described, in which the frequency of the pulse signal changes depending on the rotation speed of the motor in the case where the rotation speed of the motor is larger than 160 rpm; however, the configuration disclosed here is not limited to the example. For example, a configuration may be employed, in which the frequency of the pulse signal changes depending on the rotation speed of the motor in a case where the rotation speed of the motor is larger than the rotation speed (for example, 0 rpm) other than 160 rpm.

In addition, in the embodiment, an example is described, in which the duty ratio of the pulse signal is changed, corresponding to each of the normal stop state, the voltage protection stop state, the overheat protection stop state, the stop state due to the load freeze, and the stop state due to the pump lock; however, the configuration disclosed here is not limited to the example. For example, the duty ratio of the pulse signal may change corresponding to a case where the motor is stopped due to another cause, in addition to the above-mentioned five states.

In addition, in the embodiment, the example is described, in which the duty ratio of the pulse signal is changed, corresponding to each of the normal drive state and the idle running state; however, the configuration disclosed here is not limited to the example. For example, the duty ratio of the pulse signal may change corresponding to a case where the motor is driven due to another state, in addition to the above-mentioned two states.

An electric pump according to an aspect of this disclosure includes: a motor that drives a pump; and a control unit to which an input signal for driving the motor is input from an external device, which outputs a drive signal based on the input signal, and which outputs a pulse signal indicating a rotation state of the motor to the external device. The control unit is configured to change both of a frequency and a duty ratio of the pulse signal so as to be capable of discriminating whether the motor is in a drive state or a stop state and between a plurality of states of the motor in the stop state.

Here, in a case of a configuration in which it is possible to discriminate between states of the motor based on higher and lower potentials (frequencies) (two values) of the pulse signal than a threshold value of a voltage (a threshold value of a frequency), there is limitation to the number of discriminable states of the motor. By comparison, the electric pump according to the aspect of this disclosure has a configuration in which, as described above, both of the frequency and the duty ratio of the pulse signal are changed such that it is possible to discriminate whether the motor is in the drive state or the stop state and between the plurality of states of the motor in the stop state. In this manner, it is possible to set each of the duty ratio and the frequency for each state, and thus it is possible to easily increase the number of discriminable states to at least five or more states. As a result, it is possible to discriminate between the states of the motor with accuracy.

In the electric pump according to the aspect described above, it is preferable that the control unit is configured to set the pulse signal to a predetermined frequency in a case where the motor is in the stop state and to set the pulse signal to a frequency other than the predetermined frequency in a case where the motor is in the drive state.

In this configuration, the control unit is easily discriminable whether the motor is in the stop state or in the drive state based on the frequency of the pulse signal.

In this case, it is preferable that the control unit is configured to be capable of changing the pulse signal in a range of frequency that is different from the predetermined frequency, depending on the rotation speed of the motor, in a case where the motor is in the drive state.

In this configuration, the control unit is also discriminable of the rotation speed of the motor during drive based on the frequency of the pulse signal, in addition to discriminating whether the motor is in the stop state or in the drive state.

In the electric pump according to the aspect described above, it is preferable that the control unit is configured to change both of the frequency and the duty ratio of the pulse signal and to output a combination of information of the frequency and information of the duty ratio of the pulse signal to the external device via one signal line.

In this configuration, it is possible to output the information of the frequency of the pulse signal and the information of the duty ratio of the pulse signal to the external device via one signal line simultaneously. As a result, it is possible to more reduce the number of components (number of signal lines), compared to a case where the information of the frequency of the pulse signal and the information of the duty ratio of the pulse signal are output via separate signal lines from each other.

In the electric pump according to the aspect described above, it is preferable that the control unit is configured to set the pulse signal to the predetermined frequency in a case where the motor is in the stop state and to set the pulse signal to a frequency other than the predetermined frequency in a case where the motor is not in an energized state due to disconnection.

In this configuration, the control unit is also capable of discriminating whether the motor is in the stop state or a disconnection state based on the frequency of the motor, in addition to discriminating whether the motor is in the drive state or in the stop state and between the plurality of states in the stop state.

It is preferable that the electric pump according to the aspect described above further includes a drive unit that drives the motor, and the control unit is configured to set a duty ratio of the pulse signal to a normal stop duty ratio in a case where the motor is normally stopped and to set each of duty ratios of a first case in which the motor is stopped in a state in which a voltage value that is supplied to the control unit is out of a predetermined range, a second case in which the motor is stopped in a state in which a temperature of the drive unit is equal to or higher than a first threshold temperature, a third case in which the motor is stopped in a state in which the temperature of the drive unit is equal to or lower than a second threshold temperature, and a fourth case where the motor is stopped in a state in which the voltage value that is supplied to the control unit is within the predetermined range and the temperature of the drive unit is lower than the first threshold temperature and is higher than the second threshold temperature, to each of duty ratios that are different from the normal stop duty ratio and are different from each other.

In this configuration, the control unit is capable of discriminating whether the motor is normally stopped or abnormally stopped (the first case, the second case, the third case, and the fourth state), based on the duty ratio of the pulse signal. In addition, in a case where the motor is abnormally stopped, the duty ratios of the respective cases are different from each other, and thereby the control unit is capable of discriminating between causes of the abnormal stops.

In this application, the following configurations are also considered in the electric pump according to the aspect described above.

APPENDIX 1

In the electric pump according to the aspect described above, it is preferable that the control unit is configured to set the duty ratio of the pulse signal to a normal drive duty ratio in a case where the motor is normally driven and to set the duty ratio of the pulse signal to a duty ratio other than the normal drive duty ratio in a case where the motor is driven in a state in which the rotation speed of the motor is equal to or higher than the predetermined rotation speed.

In this configuration, the control unit is capable of discriminating whether the motor is normally driven or abnormally driven (the motor is rotated at the predetermined rotation speed or higher), based on the duty ratio of the pulse signal.

APPENDIX 2

In the electric pump in which the pulse signal is set to the frequency other than the predetermined frequency during disconnection, it is preferable that the control unit is configured to set the frequency of the pulse signal to 0 Hz and the duty ratio of the pulse signal to 0 in a case where the motor is not in the energized state due to disconnection.

In this configuration, in a case of a configuration in which a frequency and a duty ratio of the pulse signal is set to a value other than 0 in a case where disconnection does not occur, the control unit is capable of easily discriminating whether or not the disconnection occurs.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An electric pump comprising:
a motor that drives a pump; and
a control unit to which an input signal for driving the motor is input from an external device, which outputs a drive signal based on the input signal, and which outputs a pulse signal indicating a rotation state of the motor to the external device,
wherein the control unit is configured to change both of a frequency and a duty ratio of the pulse signal so as to be capable of discriminating whether the motor is in a drive state or a stop state and between a plurality of states of the motor in the stop state, and
wherein the control unit is configured to change both of the frequency and the duty ratio of the pulse signal and to output a combination of information of the frequency and information of the duty ratio of the pulse signal to the external device via one signal line.

2. The electric pump according to claim 1,
wherein the control unit is configured to set the pulse signal to a predetermined frequency in a case where the motor is in the stop state and to set the pulse signal to a frequency other than the predetermined frequency in a case where the motor is in the drive state.

3. The electric pump according to claim 2,
wherein the control unit is configured to be capable of changing the pulse signal in a range of frequency that is different from the predetermined frequency, depending on the rotation speed of the motor, in a case where the motor is in the drive state.

4. The electric pump according to claim 1,
wherein the control unit is configured to set the pulse signal to the predetermined frequency in a case where the motor is in the stop state and to set the pulse signal to a frequency other than the predetermined frequency in a case where the motor is not in an energized state due to disconnection.

5. The electric pump according to claim 1, further comprising:
a drive unit that drives the motor,
wherein the control unit is configured to set a duty ratio of the pulse signal to a normal stop duty ratio in a case where the motor is normally stopped and to set duty ratios of a first case in which the motor is stopped in a state in which a voltage value that is supplied to the control unit is out of a predetermined range, a second case in which the motor is stopped in a state in which a temperature of the drive unit is equal to or higher than a first threshold temperature, a third case in which the motor is stopped in a state in which the temperature of the drive unit is equal to or lower than a second threshold temperature, and a fourth case where the motor is stopped in a state in which the voltage value that is supplied to the control unit is within the predetermined range and the temperature of the drive unit is lower than the first threshold temperature and is higher than the second threshold temperature, to duty ratios that are different from the normal stop duty ratio and are different from each other.

6. An electric pump comprising:
a motor that drives a pump; and
a control unit to which an input signal for driving the motor is input from an external device, which outputs a drive signal based on the input signal, and which outputs a pulse signal indicating a rotation state of the motor to the external device,
wherein the control unit is configured to change both of a frequency and a duty ratio of the pulse signal so as to be capable of discriminating whether the motor is in a drive state or a stop state and between a plurality of states of the motor in the stop state, and
wherein the control unit is configured to set the pulse signal to a predetermined frequency in a case where the motor is in the stop state and to set the pulse signal to a frequency other than the predetermined frequency in a case where the motor is in the drive state.

7. The electric pump according to claim 6,
wherein the control unit is configured to be capable of changing the pulse signal in a range of frequency that is different from the predetermined frequency, depending on the rotation speed of the motor, in a case where the motor is in the drive state.

8. The electric pump according to claim 6,
wherein the control unit is configured to set the pulse signal to the predetermined frequency in a case where the motor is in the stop state and to set the pulse signal to a frequency other than the predetermined frequency in a case where the motor is not in an energized state due to disconnection.

9. The electric pump according to claim 6, further comprising:
a drive unit that drives the motor,
wherein the control unit is configured to set a duty ratio of the pulse signal to a normal stop duty ratio in a case where the motor is normally stopped and to set duty ratios of a first case in which the motor is stopped in a state in which a voltage value that is supplied to the control unit is out of a predetermined range, a second case in which the motor is stopped in a state in which a temperature of the drive unit is equal to or higher than a first threshold temperature, a third case in which the motor is stopped in a state in which the temperature of the drive unit is equal to or lower than a second threshold temperature, and a fourth case where the motor is stopped in a state in which the voltage value that is supplied to the control unit is within the predetermined range and the temperature of the drive unit is lower than the first threshold temperature and is higher than the second threshold temperature, to duty ratios that are different from the normal stop duty ratio and are different from each other.

10. An electric pump comprising:
a motor that drives a pump;
a drive unit that drives the motor; and
a control unit to which an input signal for driving the motor is input from an external device, which outputs a drive signal based on the input signal, and which outputs a pulse signal indicating a rotation state of the motor to the external device,
wherein the control unit is configured to change both of a frequency and a duty ratio of the pulse signal so as to be capable of discriminating whether the motor is in a drive state or a stop state and between a plurality of states of the motor in the stop state, and wherein the control unit is configured to set a duty ratio of the pulse signal to a normal stop duty ratio in a case where the motor is normally stopped and to set duty ratios of a first case in which the motor is stopped in a state in which a voltage value that is supplied to the control unit is out of a predetermined range, a second case in which the motor is stopped in a state in which a temperature of the drive unit is equal to or higher than a first threshold temperature, a third case in which the motor is stopped in a state in which the temperature of the drive unit is equal to or lower than a second threshold temperature, and a fourth case where the motor is stopped in a state in which the voltage value that is supplied to the control unit is within the predetermined range and the temperature of the drive unit is lower than the first threshold temperature and is higher than the second threshold temperature, to duty ratios that are different from the normal stop duty ratio and are different from each other.

11. The electric pump according to claim 10, wherein the control unit is configured to set the pulse signal to the predetermined frequency in a case where the motor is in the stop state and to set the pulse signal to a frequency other than the predetermined frequency in a case where the motor is not in an energized state due to disconnection.

* * * * *